(12) United States Patent
Bakker

(10) Patent No.: US 8,707,835 B2
(45) Date of Patent: Apr. 29, 2014

(54) DEVICE FOR TURNING A BRAKE DISC ON A VEHICLE

(76) Inventor: Johannes Hendricus Bakker, Son en Breugel (NL)

(*) Notice: Subject to any disclaimer, the term of this patent is extended or adjusted under 35 U.S.C. 154(b) by 1008 days.

(21) Appl. No.: 12/091,509

(22) PCT Filed: Oct. 25, 2006

(86) PCT No.: PCT/NL2006/000538
§ 371 (c)(1),
(2), (4) Date: Jan. 27, 2011

(87) PCT Pub. No.: WO2007/049958
PCT Pub. Date: May 3, 2007

(65) Prior Publication Data
US 2011/0113937 A1 May 19, 2011

(30) Foreign Application Priority Data
Oct. 25, 2005 (NL) .................................... 1030263

(51) Int. Cl.
*B23B 5/02* (2006.01)
(52) U.S. Cl.
CPC ........................ *B23B 5/02* (2013.01)
USPC ........................................................ 82/112
(58) Field of Classification Search
USPC .................................... 82/105, 112, 113, 153

IPC ........................................ B23B 5/02,5/08, 5/12
See application file for complete search history.

(56) References Cited

U.S. PATENT DOCUMENTS

| | | | | |
|---|---|---|---|---|
| 3,958,904 A | * | 5/1976 | Rusbach | 403/90 |
| 4,455,900 A | * | 6/1984 | Callanan et al. | 82/112 |
| 4,478,116 A | * | 10/1984 | Fuller | 82/112 |
| 6,363,821 B1 | * | 4/2002 | Greenwald et al. | 82/1.11 |
| 2001/0000378 A1 | * | 4/2001 | Newell et al. | 82/1.11 |
| 2003/0000352 A1 | * | 1/2003 | Caorle | 82/112 |

FOREIGN PATENT DOCUMENTS

WO  WO2007/049958  5/2007

* cited by examiner

*Primary Examiner* — Daniel Howell
*Assistant Examiner* — Alan Snyder
(74) *Attorney, Agent, or Firm* — Eric Karich

(57) ABSTRACT

A device for holding a movable tool holder at right angles to a shaft for turning a brake disc on a vehicle, has a coupling section, which is formed by a plate that is fastened against a hub on the shaft, and securing devices, in the form of a disc, for securing the tool holder. The device also has devices for holding the tool holder at right angles to the shaft. These devices are formed by a hinge construction, which is built up of a sphere, which is fastened on an ancillary shaft that is fastened in the plate, and two scale-shaped parts. The scale-shaped parts can be pressed towards each other by turning a hollow nut, so that they can be clamped onto the sphere and block the hinge construction.

2 Claims, 1 Drawing Sheet

DEVICE FOR TURNING A BRAKE DISC ON A VEHICLE

BACKGROUND OF THE INVENTION

1. Field of the Invention

The invention relates to a device for holding an ancillary device at right angles to a theoretical rotation axis, in particular a movable tool holder, for turning a brake disc present on a vehicle, comprising a coupling section, which turns on a shaft around the rotation axis, or can be fastened to a hub present on that shaft, securing devices for securing the ancillary device, and devices for keeping the ancillary device at right angles.

When attaching the coupling section to a shaft, which turns around the theoretical rotation axis, or against a hub present on that shaft, it is possible that the coupling section wobbles when the shaft rotates. This can happen for various reasons. Firstly, the coupling section may not be at right angles to the shaft or attached parallel to the hub, for example due to contamination on the shaft or hub. The shaft can also wobble if its centre line does not coincide with the theoretical rotation axis, but cuts or crosses the rotation axis, so that the coupling section also wobbles. The hub may also not be present at right angles to the shaft so that it wobbles and as does the coupling section.

2. Prior Art

Such a device is generally known and is used for keeping a movable tool holder, which is used for turning a brake disc present on a vehicle, at right angles to an axis. It is generally known that brake discs of vehicles wobble after long usage even before the discs are worn (i.e. have become too thin). Brake discs are therefore turned if they wobble too much. To do this the turning tool must be placed at right angles to the rotation axis of the brake disc and be moved along the brake disc. It is also desirable to connect the tool holder to the hub, on which the brake disc is present, in order to turn the brake disc. If the connecting surface of the hub is not flat, for example due to corrosion of the hub, the coupling section and the tool holder connected to the coupling section will wobble when the hub rotates. In the known device the connection between the coupling section and the tool holder is such that the latter does not wobble, even if the coupling section should wobble. This known device is complex and it requires a relatively long time to adjust the tool holder so that it does not wobble.

SUMMARY OF THE INVENTION

An objective of the invention is to provide a device of the sort described in the preamble which is simpler and quicker to adjust than the known device. For this purpose the device according to the invention is characterised in that the devices for holding the ancillary device at right angles comprise a hinge construction according to the spherical hinge principle, a first part of which has a spherical function and a second part of which has a scale function, where the first part is connected to the coupling section and the second part is connected to the securing devices.

A hinge construction according to the spherical hinge principle is here defined as every hinge construction in which the parts hinged together can be turned around the same axes as a spherical hinge. Moreover with a part with a spherical function and a part with a scale function, each part must be defined as that which facilitates the turning of the parts connected together through all possible angles. A part with a spherical function therefore also includes a part that comprises two spherical parts present at a distance from each other, as is shown in the appended figures, and a part with a scale function therefore also includes a part that comprises two hinged sections present at a distance from each other, as is also shown in the appended figures.

By placing the ancillary device at right angles to the rotation axis, which is possible with the hinge construction mentioned, the ancillary device will not wobble on rotation. Preferably the second part has a bearing connection in the securing devices so that the ancillary device does not have to turn with it.

The device according to the invention is therefore extremely simple and is quick and simple to adjust. The adjustment of the ancillary device can for example be done by connecting it to a displacement meter, for example a dial gauge, and by moving this until it no longer wobbles whilst the shaft or hub to which the coupling section is connected is rotating.

To prevent upsetting the ancillary device after it has been adjusted to be wobble-free, an embodiment of the device according to the invention is characterised in that the hinge construction can be blocked so that neither part can be moved with respect to each other.

A practical embodiment of the device according to the invention is characterised in that the first part is formed by a sphere with a hollow tube passing through it, which is connected to the coupling section, and in that the second part comprises two rotationally symmetrical scale-shaped parts that have an opening in the middle and are pushed over the tube of the first part, so that the sphere is enclosed between both scale-shaped parts, and in which both scale-shaped parts can be clamped onto the sphere.

To facilitate the alignment or wobble-free adjustment of the securing devices, a further embodiment of the device according to the invention is characterised in that the device also comprises adjustment devices, which are fixed on one hand to a firm object and on the other to the securing devices, for the adjustment of the securing devices at right angles to the rotation axis. The firm object in this context can for example be a bearing in which a shaft, the centre line of which coincides with the theoretical rotation axis, has a bearing connection and the adjustment devices can for example comprise an adjustment spindle.

In cars provided with safety provisions it could be that the brake disc to be turned cannot be rotated sufficiently quickly. In this case the device can be rotated about its centre line. After the device has been set at right angles, it is still necessary to undo the adjustment devices from the device and to balance the device and to bring it into line with the brake disc to be turned.

BRIEF DESCRIPTION OF THE DRAWINGS

The invention will be elucidated more fully below on the basis of drawings in which an embodiment of the device according to the invention is shown. In these drawings.

DETAILED DESCRIPTION OF THE DRAWINGS

Figure 1:
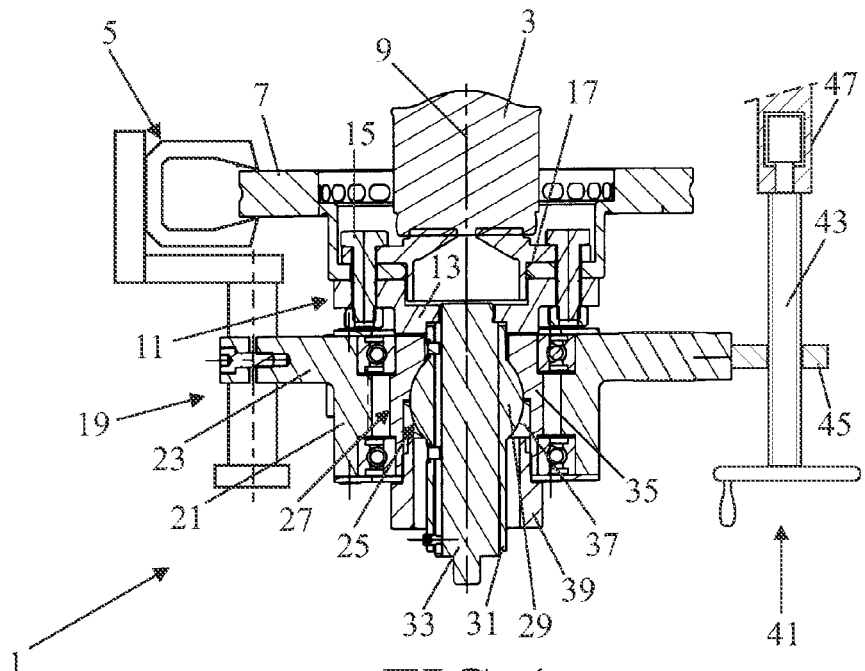
FIG. 1 shows an embodiment of the device according to the invention in cross-section.
Figure 2:
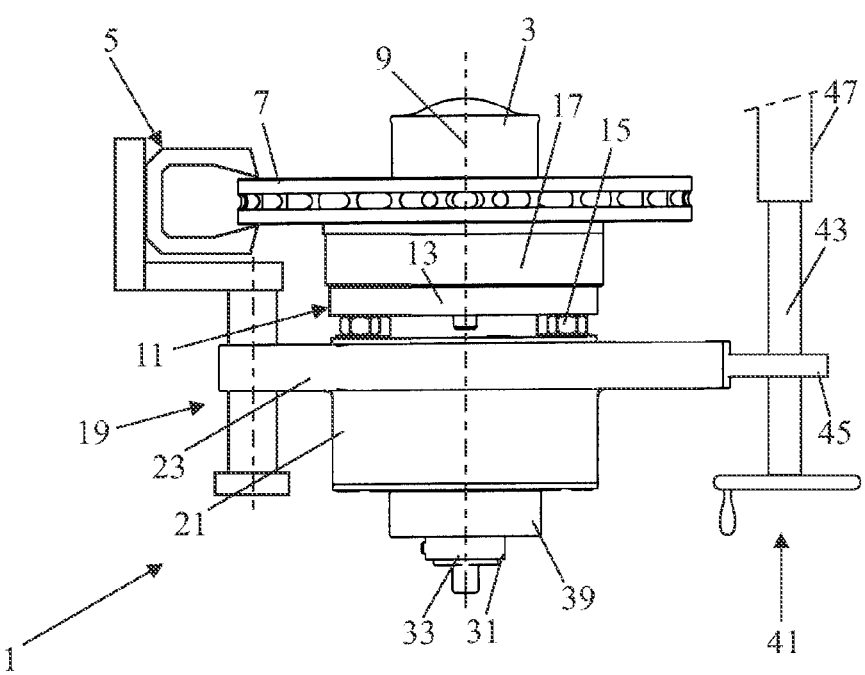
FIG. 2 shows the device shown in FIG. 1 from above.

FIGS. 1 and 2 show an embodiment of the device according to the invention in cross-section and from above respectively. The device shown in this embodiment is a device 1 for holding a movable tool holder 5 at right angles to a shaft 3 for turning a brake disc 7 present on a vehicle The tool holder 5 is here thus the above ancillary device and the above rotation axis coincides with the centre line 9 of the shaft 3 on which the brake disc is present.

The device 1 has a coupling section 11, which is formed by a plate 13 that can be fastened with bolts 15 to a hub 17 on the shaft 3, and securing devices 19, in the form of a disc 23 provided with a hub 21, for securing the tool holder 5. The device 1 also has devices for holding the tool holder 5 at right angles to the shaft 3. These devices are formed by a hinge construction according to the spherical hinge principle, which is composed of a first part 25 with a spherical function that is fastened to the plate 13, and a second part 27 with a scale function that has a bearing connection in the hub 21 of the securing devices.

The first part 25 is formed by a sphere 29 with a hollow tube 31 running through it, which is fastened on an ancillary shaft 33 that is fastened in a opening in the plate 13. The second part 27 is formed by a compression fitting having a receiver 35 and a compression ring 37, which have an opening between them, and are pushed over the tube 31 of the first part. The receiver 35 is spherically curved in one portion of the interior surface of the receiver 35, as shown in FIG. 1, for matching the curvature of the sphere 29, thus able to receive the sphere 29. The compression ring 37 also has, on its interior surface, a curvature matching the curvature of the sphere 29. However, it is shaped to leave a gap between the compression ring 37 and the receiver 35 for allowing the inner surface of the compression ring 37 to press upon the surface of the sphere 39 when an axially directed force acts to press the compression ring 37 towards the receiver 35. The sphere 29 is thus enclosed between both the receiver 35 and the compression ring 37. The receiver 35 and the compression ring 37 can be pressed towards each other by turning a hollow nut 39, so that they can be clamped onto the sphere 29 locking the hinge in place.

The device 1 also has adjustment devices 41 for adjusting the securing devices 19 at right angles to the rotation axis (centre line 9). The adjustment devices are in this embodiment formed by a threaded spindle 43, which can be moved in an opening, provided with internal thread, in a pin 45 present on the disc 23 of the securing devices, an extremity of which pin has a bearing connection in a pipe 47, which is connected to a firm object, for example a hub in which the shaft 3 has a bearing connection. The disc 23 of the securing devices is rotated with the aid of the adjustment devices 41 around the sphere 29 of the hinge construction until it no longer wobbles. This can for example be checked by rotating the shaft and holding a dial gauge, connected to firm object, against the disc 23, in which the disc is held back by the threaded spindle 43 so that it does not rotate with the shaft 3.

Although in the above the invention is explained on the basis of the drawings, it should be noted that the invention is in no way limited to the embodiment shown in the drawings. The invention also extends to all embodiments deviating from the embodiment shown in the drawings within the context defined by the claims.

Thus the device can also be used to turn or level a part, for example an end of a tube, in which the surface to be worked must be placed at right angles to the centre line of the part. In this case, after adjusting the device at right angles to the centre line of the part, the part to be worked is held stationary and the device is rotated about its centre line. After adjusting the device at right angles, the device must still be balanced and, depending on the use, it will still also be necessary to bring the device into line with the part to be levelled. Grinding or another technique, such as milling, can be used for processing instead of turning.

What is claimed is:

1. A movable tool holder for turning a brake disc, the tool holder comprising:
    a cutting tool for cutting the brake disc;
    a shaft mounted for rotation about a rotation axis;
    a coupling section that includes a plate fastened by bolts to a hub that is mounted on the shaft;
    securing devices for securing the brake disc; and
    devices for keeping the brake disc at right angles, wherein the devices comprise:
        a hinge construction with a first part formed by a sphere and a second part formed by a receiver and a compression ring;
        wherein the receiver is connected to the coupling section;
        wherein the compression ring is connected to the securing devices;
        a bearing connection connecting the second part and the securing devices;
        wherein the first part is connected to the coupling section and the second part is connected to the securing devices; and
        wherein the sphere has a hollow tube passing through it, which is connected to the coupling section, and in that the sphere, receiver, and compression ring have an opening in the middle and are pushed over the tube of the first part, so that the sphere is enclosed between both the receiver and the compression ring, and in which the receiver and the compression ring may be clamped onto the sphere.

2. The movable tool holder according to claim 1, further comprising adjustment devices, which are fixed on one hand to a firm object and on the other to the securing devices, for the adjustment of the securing devices at right angles to the rotation axis.

* * * * *